United States Patent
Argumedo

[11] Patent Number: 6,135,379
[45] Date of Patent: Oct. 24, 2000

[54] MAGNETIC RECORDING TAPE LEADER FOR SINGLE REEL TAPE CARTRIDGE

[75] Inventor: Armando Jesus Argumedo, Tucson, Ariz.

[73] Assignee: International Business Machines Corporation, Armonk, N.Y.

[21] Appl. No.: 09/350,208

[22] Filed: Jul. 8, 1999

[51] Int. Cl.[7] .................................................. G03B 23/02
[52] U.S. Cl. ......................................... 242/348.2; 360/132
[58] Field of Search .............................. 242/348.2, 532.6, 242/332.8, 332.4, 532.7; 360/132

[56] References Cited

U.S. PATENT DOCUMENTS

| | | |
|---|---|---|
| 3,244,378 | 4/1966 | Rost . |
| 3,379,387 | 4/1968 | Takahashi et al. ............... 242/332.8 X |
| 3,931,643 | 1/1976 | Kuroe . |
| 4,164,604 | 8/1979 | Tamai et al. . |
| 4,426,047 | 1/1984 | Richard et al. . |
| 4,446,205 | 5/1984 | Mizuno et al. . |
| 4,452,406 | 6/1984 | Richard . |
| 4,680,225 | 7/1987 | Ogawa et al. . |
| 4,803,120 | 2/1989 | Ogawa et al. . |
| 5,251,090 | 10/1993 | Cheatham et al. ............... 242/348.2 X |
| 5,332,173 | 7/1994 | Kubota et al. . |
| 5,463,519 | 10/1995 | Dodt et al. . |
| 5,845,860 | 12/1998 | Tohjo et al. ...................... 242/332.4 X |

FOREIGN PATENT DOCUMENTS

| | | |
|---|---|---|
| 2365095 | 3/1975 | Germany . |
| 55-7631 | 2/1980 | Japan . |
| 1-122012 | 5/1989 | Japan . |
| 1-122013 | 5/1989 | Japan . |
| 4-337553 | 11/1992 | Japan . |
| 8-063718 | 3/1996 | Japan . |

*Primary Examiner*—Donald P. Walsh
*Assistant Examiner*—William A Rivera
*Attorney, Agent, or Firm*—Robert B. Martin; Felsman, Bradley, Vaden, Gunter & Dillon, LLP

[57] ABSTRACT

A tape cartridge contains a spool of tape with a leader block on one end that inserts into a tape storage reel. The tape has a leader segment that is attached to the leader block and a media segment that is attached to the leader segment with a small piece of adhesive tape. The leader tape is much thicker and stiffer than the media segment, but is only a few meters long. The media segment is a thin, high capacity magnetic tape that fills the remainder of the cartridge. The leader block is loaded into the reel and the leader segment is wound around the hub to create several protective layers prior to winding the magnetic tape on the reel. The leader tape reduces the wear on the magnetic tape during loading and unloading, and reduces the effect of any discontinuity formed between the leader block and the hub.

8 Claims, 2 Drawing Sheets

MAGNETIC RECORDING TAPE LEADER FOR SINGLE REEL TAPE CARTRIDGE

BACKGROUND OF THE INVENTION

1. Technical Field

This invention relates in general to magnetic recording tape and in particular to an apparatus and method for winding magnetic recording tape with a leader on a single reel tape cartridge.

2. Background Art

One type of magnetic media tape on single reel tape cartridges is typically threaded into and unthreaded from a tape drive with a leader block. Occasionally, these systems experience breakage within the first meter of tape, particularly with thin, high capacity magnetic tapes. The cause for breakage is the repeated tape thread/unthread cycling on the tape drive. The tape becomes progressively damaged with increasing thread cycles as the tape passes over guiding components in the tape path of the drive. In particular, the edges of the tape are forced into and out of tape guiding channels that can be mispositioned slightly relative to the path that the threading mechanism takes during operation. The mispositioning causes deformation of the tape edges as the tape is forced to accommodate the offset location of the guiding elements.

Another problem encountered in the tape drive occurs at the interface between the drive hub and the leader block on the leading end of the tape. Ideally, the outer edge of a leader block should be substantially flush with the outer diameter of the reel hub. However, in the prior art, there is a misalignment range of approximately +/−100 microns. As shown in FIGS. 4 and 5, a small but significant embossment 101, 103, respectively, is formed in subsequent layers of the thin magnetic tape 105 wrapped around the hub 107. Embossment 101, 103 form on top of the edges of the leader block 109 and on top of the throat edges of hub 107, respectively. These discontinuities can result in recording errors in the tape where data is recorded. An improved tape loading/unloading system is needed.

SUMMARY OF THE INVENTION

A tape cartridge contains a spool of tape with a leader block on one end that inserts into a tape storage reel. The tape has a leader segment that is attached to the leader block and a media segment that is attached to the leader segment with a small piece of adhesive tape. The leader tape is much thicker and stiffer than the media segment, but is only a few meters long. The media segment is a thin, high capacity magnetic tape that fills the remainder of the cartridge.

The leader block is loaded into the reel and the leader segment is wound around the hub to create several protective layers prior to winding the magnetic tape on the reel. The leader tape reduces the wear on the magnetic tape during loading and unloading, and reduces the effect of any discontinuity formed between the leader block and the hub.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
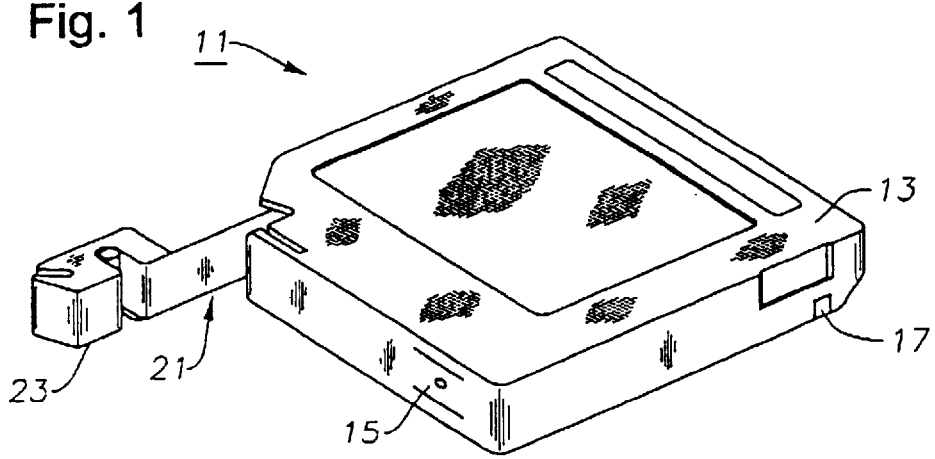
FIG. 1 is an isometric view of a tape cartridge assembly.

Referring to FIG. 1, a tape cartridge assembly 11 is shown. Assembly 11 has a cartridge case 13 with an external file-protect selector 15 and locating notch 17. Case 13 contains a spool of tape 21 that may be extracted or rewound. The free or external end of tape 21 is connected to a leader block 23.

Figure 2:
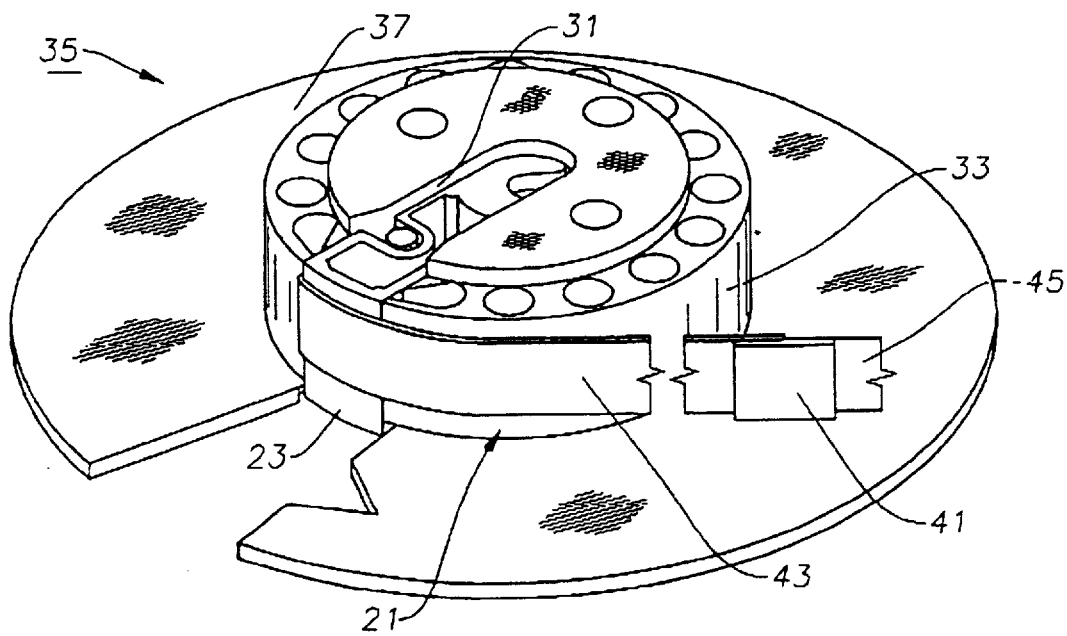
FIG. 2 is an isometric view of a portion of a tape storage reel having magnetic tape constructed in accordance with the invention.
Figure 3:
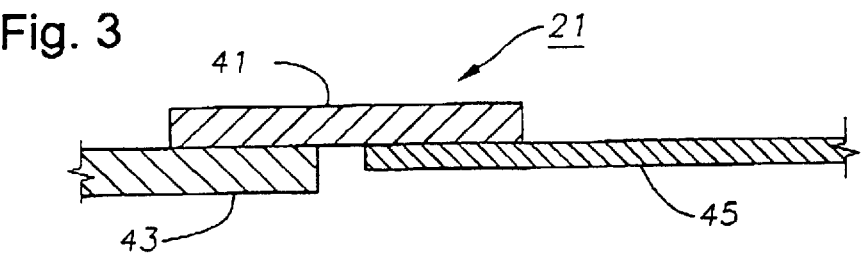
FIG. 3 is a sectional side view of a portion of the magnetic tape of FIG. 2.
Figure 4:
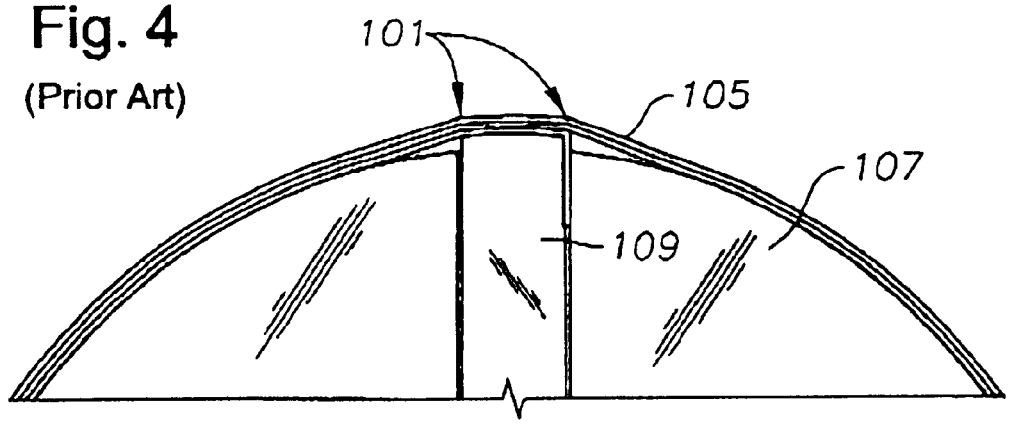
FIG. 4 is a side view of a prior art tape reel showing a protruding leader block.
Figure 5:
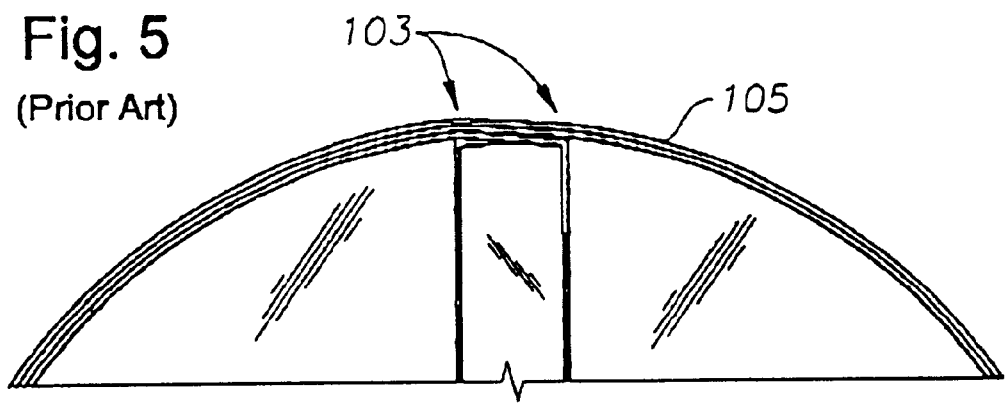
FIG. 5 is a side view of the prior art reel system of FIG. 4 showing a recessed leader block.

As shown in FIG. 2, leader block 23 inserts into a notch 31 in the hub 33 of a tape storage reel 35. Reel 35 has a pair of external, parallel flanges 37 (one shown) for guiding and protecting tape 21. Tape 21 actually comprises two different kinds of tape that are spliced together with a piece of adhesive tape 41. The first or outer strip of tape 21 is a tape leader 43. In one embodiment, tape leader 43 is formed from a chrome tape having a 56-gauge substrate. It has a total thickness of approximately 18 microns and a length of one to three meters. The second or inner strip of tape 21 is a thin, high capacity magnetic media tape 45 having a thickness of approximately 11 microns and a length 210 that substantially fills the spool in cartridge 13.

Adhesive tape 41 butt-splices tapes 43, 45 to one another with a longitudinal gap between tapes 43, 45 of less than 100 microns. Tapes 43, 45 can accommodate a maximum lateral offset of 100 microns from one another. Adhesive tape 41 does not overlap the lateral side edges of tapes 43, 45, and the adhesive on tape 41 does not flow or become exposed. Tape 41 has a thickness in the range of 18 to 40 microns and a length of about 12.5 mm.

Figure 6:
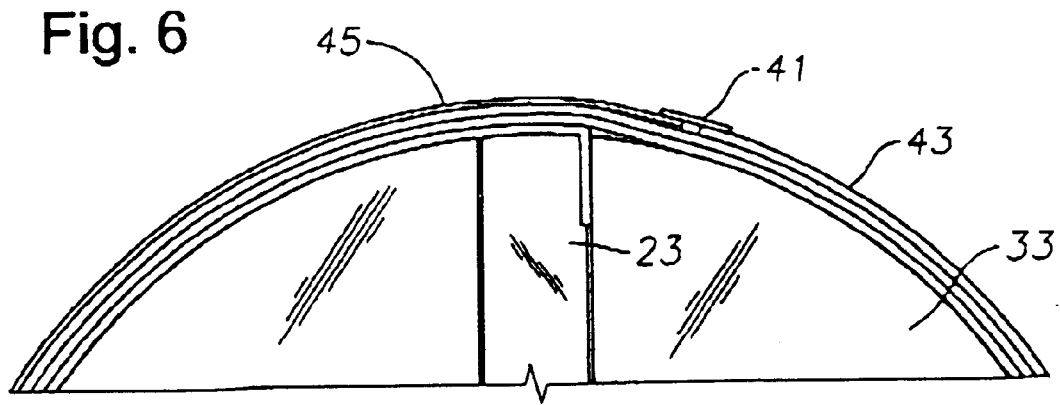
FIG. 6 is a side view of the tape reel of FIG. 2.

In operation (FIG. 6), leader block 23 is loaded into reel 35 with the drive threader (not shown). In the preferred embodiment, the outer edge of leader block 23 will be within 100 microns of the outer diameter of hub 33. Leader tape 43 is wound around the hub 33 (counterclockwise in FIG. 6) to create several layers of the thicker and stiffer chrome tape 43 prior to magnetic tape 45 being layered on the reel 35. Leader tape 43 reduces the wear on tape 45 during loading and unloading, and reduces the effect of any discontinuity formed by leader block 23 by masking its presence. The presence of the adhesive tape 41 has a negligible effect on performance.

The invention has several advantages. The relatively thick leader tape provides a number of wraps over the discontinuity present at the take-up reel hub and tape leader block interface. These thick wraps reduce embossment from the leader block and the hub throat edges, thereby reducing recording errors. In addition, the leader tape is much tougher than the thin, high capacity magnetic tape. This feature eliminates breakage of the magnetic tape as it is threaded through the tape path components. The abrasive, chrome oxide coating on the leader tape also provides the added advantage of "scrubbing" the recording head upon every cartridge load/unload. These head scrubbing operations keep the head surface clear of build-up that is known to affect recording head performance.

While the invention has been shown or described in only some of its forms, it should be apparent to those skilled in the art that it is not so limited, but is susceptible to various changes without departing from the scope of the invention.

I claim:

1. A single reel tape cartridge assembly, comprising:

a cartridge case;

a winding of magnetic media tape located within the cartridge case and extendable therefrom, the magnetic media tape having a leading end;

a winding of leader tape having a length in the range of one to three meters, a block end, a trailing end attached to the leading end of the magnetic media tape, wherein the leader tape is approximately twice as thick as the magnetic tape; and a leader block mounted to the block end of the leader tape, wherein the leader block is adapted to be loaded onto a take-up reel such that the leader tape wraps around the take-up reel prior to the magnetic media tape winding around the reel.

2. The assembly of claim 1 wherein the leader tape has a thickness in the range of 18 to 40 microns.

3. The assembly of claim 1 wherein the leader tape has a chrome oxide coating.

4. The assembly of claim 1 wherein the leader tape is joined to the magnetic media tape with a strip of adhesive tape.

5. A single reel tape cartridge assembly, comprising:

a cartridge case;

a winding of magnetic media tape located within the cartridge case and extendable therefrom, the magnetic media tape having a leading end;

a strip of adhesive tape affixed to the leading end of the magnetic media tape;

a winding of leader tape having a chrome oxide coating, a block end and a trailing end affixed to the adhesive tape, the leader tape having a length in the range of one to three meters, a thickness in the range of 18 to 40 microns that is approximately twice as thick as the magnetic media tape, and a width that is less than or equal to a width of the magnetic media tape; and a leader block mounted to the block end of the leader tape, wherein the leader block is adapted to be loaded onto a reel such that the leader tape wraps around the reel prior to the magnetic media tape winding around the reel.

6. A method for loading a single reel tape cartridge assembly, comprising:

(a) providing a cartridge case with a winding of magnetic media tape and a winding of leader tape attached to a leading end of the magnetic media tape, the leader tape having a leader block mounted to an opposite end;

(b) loading the cartridge assembly into a drive unit such that the leader block is inserted into a reel, wherein an outer edge of the leader block misaligns with the reel to define a discontinuity;

(c) wrapping one to three meters of the leader tape around the reel to form several layers on the reel to overcome the discontinuity; and then (d) wrapping the magnetic media tape around the reel on top of the wraps of leader tape.

7. The method of claim 6 wherein step (a) comprises providing the leader tape with a chrome oxide coating.

8. The method of claim 6, further comprising the step of joining the leader tape to the magnetic media tape with a strip of adhesive tape.

* * * * *

UNITED STATES PATENT AND TRADEMARK OFFICE
CERTIFICATE OF CORRECTION

PATENT NO. : 6,135,379
DATED : October 24, 2000
INVENTOR(S) : Argumedo

It is certified that error appears in the above-identified patent and that said Letters Patent are hereby corrected as shown below:

In Col. 2, line 36, please delete "210"

Signed and Sealed this

Fifteenth Day of May, 2001

Attest:

NICHOLAS P. GODICI

Attesting Officer     *Acting Director of the United States Patent and Trademark Office*